(12) United States Patent  (10) Patent No.: US 7,130,648 B1
Fournier et al.  (45) Date of Patent: Oct. 31, 2006

(54) MESSAGE TRANSMISSION SYSTEM AND METHOD, AND UTILIZATION OF THE TRANSMISSION SYSTEM TO INVESTIGATE SERVICES OFFERED

(75) Inventors: Jean-Claude Fournier, Noyal sur Vilaine (FR); Stéphane Rose, Paris (FR)

(73) Assignee: CP8 Technologies, Paris (FR)

( * ) Notice: Subject to any disclaimer, the term of this patent is extended or adjusted under 35 U.S.C. 154(b) by 889 days.

(21) Appl. No.: 09/868,332

(22) PCT Filed: Oct. 18, 2000

(86) PCT No.: PCT/FR00/02895

§ 371 (c)(1),
(2), (4) Date: Jun. 18, 2001

(87) PCT Pub. No.: WO01/30093

PCT Pub. Date: Apr. 26, 2001

(30) Foreign Application Priority Data

Oct. 18, 1999 (FR) .................................. 99 12970

(51) Int. Cl.
*H04Q 7/20* (2006.01)
(52) U.S. Cl. .................................. 455/466; 455/414.1
(58) Field of Classification Search ................ 455/466, 455/566, 414.1, 558, 557
See application file for complete search history.

(56) References Cited

U.S. PATENT DOCUMENTS

| 5,635,914 | A |  | 6/1997 | Gade et al. |
| 5,844,498 | A |  | 12/1998 | Ide |
| 6,119,014 | A | * | 9/2000 | Alperovich et al. ........ 455/466 |
| 6,519,468 | B1 | * | 2/2003 | Donovan et al. ........... 455/466 |

FOREIGN PATENT DOCUMENTS

GB  2 327 567 A  1/1999

* cited by examiner

*Primary Examiner*—Fan Tsang
*Assistant Examiner*—Olisa Anwah
(74) *Attorney, Agent, or Firm*—Miles & Stockbridge P.C.; Edward J. Kondracki (57) ABSTRACT

The present invention relates to a message transmission system comprising a telecommunication network (2) comprising a communication server (4) and at least one wireless telephone (1), the server comprising means for sending messages to one or more wireless telephones, the wireless telephone or telephones (1) being equipped with means for storing and processing message (Mess-Serv), characterized in that the messages (Mess-Serv) comprise a first field (V-TYP) containing information relating to the type profile of the recipient of the message and in that the processing means compare the profile stored in each wireless telephone relative to the subscriber using the wireless telephone to the profile contained in the message, and authorize the storage of the messages in the storage means if the profile of the subscriber using the wireless telephone is compatible with the type profile contained in the field of the message.

6 Claims, 4 Drawing Sheets

| HEADER OF THE FILE "PROFILE" | | |
|---|---|---|
| T = <<NOM>> | L = 20 byte(s) | <<Stéphane ROSE>> |
| T = <<AGE>> | L = 2 byte(s) | <<1960>> |
| T = <<SEX>> | L = 1 byte(s) | <<M>> |
| T = <<SUBSCRIPTION>> | L = 1 byte(s) | <<2-4>> hours |

| Tn or Ta | n bytes | FSi-j | PROFILE DATA |

Not-Ack

FIG. 5

MESSAGE TRANSMISSION SYSTEM AND METHOD, AND UTILIZATION OF THE TRANSMISSION SYSTEM TO INVESTIGATE SERVICES OFFERED

FIELD OF THE INVENTION

The present invention relates to a system and a method for transmitting messages, and the utilization of the transmission system to investigate services offered, for example in a wireless telephone network, for example of the GSM type.

More particularly, the invention involves the display of advertising messages on the screens of wireless telephones. The user of the telephone then chooses whether or not to request further information on the services advertised, or "offered." No services are "provided" via the message transmission system.

DESCRIPTION OF RELATED ART

The GSM system is currently well known, widely used, and accessible to a large number of people. It comprises a network constituted by servers connected to radiocommunication beacons, and by a set of wireless telephones equipped with a SIM card. The SIM card is an electronic circuit linked to a terminal, such as a wireless telephone, either by contact pads or by a contactless connection, for example via radio frequencies. The electronic circuit of the SIM card comprises an integrated circuit that incorporates a microprocessor and a programmable nonvolatile memory comprising all of the information required by the user and the operator. The wireless telephone comprises means for communicating with the SIM card, and the communication takes place in accordance with the ISO 7816-3 standard, which is a general standard, and in accordance with the ETSI standards specific to wireless telephones.

According to the ETSI standards, the SIM card can send and receive "short messages" called "SMS." These messages are standardized under the GSM standards 03-40 for transporting messages, 03-48 for transport security, 11.11 and 11.14 for the operations performed by the card. Short messages are codified by means of control characters (identifier, sender's address, number of bytes, etc.) and data displayed on a wireless telephone. There are two types of short messages, depending on the recipient: "SMS-PP" messages of the point-to-point type, and "SMS-CB" messages for "cell broadcast." SMS-PP messages have a header that specifically defines the subscriber to whom the message is sent. SMS-CB messages, on the other hand, are "broadcast": the sender does not know who will receive them. In this case, all connected wireless telephones located in the reception area receive the message. The short message is then transmitted to the card, which decodes it. At the same time, an acknowledgement-of-receipt message can be sent to the sender. This type of message is used, for example, when travelers arrive in airports: the radiocommunication beacon continuously sends data related to hotel occupancy, car rental agencies, the exchange rate of the local currency, etc.

The contents of short messages can be stored in a message file "EF-SMS" of the programmable memory of the SIM card. It is also possible to store short messages in various files, either based on the type of the application, for example, hotels, car rental agencies, etc., or based on the sender of the message, for example a travel advertiser. The subscriber consults his SIM card in order to see the data it has recorded.

The data of the short message can contain a telephone number, which the user calls in order to use the service offered.

The GSM system makes it possible to transmit data from one or more service providers to a subscriber or to a group of subscribers. During a telephone communication, the parties are identified; thus a service provider can know which subscriber is calling it. Likewise, during the reading of a short message, as long as the wireless telephone can communicate with the GSM network, application notifications can be sent to the server specified in the header of the short message. However, the server cannot determine the number of subscribers who have received the message and have not called. Therefore, the server cannot establish statistical data on the impact of its messages. Finally, the server cannot know the characteristics of the subscribers who have called, in order to determine the types of people interested in its messages.

Another drawback of the prior art is the fact that all the short messages are systematically stored in the memory of the SIM card, even those that hold no interest for the subscriber. Thus, the memory of the SIM card can quickly be filled up with data that is useless to the subscriber.

SUMMARY OF THE INVENTION

The object of the present invention is to develop a transmission system that makes it possible to select target recipients.

This object is achieved through the fact that the message transmission system comprises a telecommunication network comprising a communication server and at least one wireless telephone, the server comprising means for sending messages, communicates with one or more wireless telephones, the wireless telephone or telephones being equipped with means for displaying and means for storing and processing messages, is characterized in that the message comprises a first field containing information relating to the type profile of the recipient of the message, and in that the processing means compare the profile stored in each wireless telephone relative to the subscriber using the wireless telephone with the profile contained in the message and authorize the storage of the messages in the storage means if the profile of the subscriber using the wireless telephone is compatible with the type profile contained in the field of the message.

According to another characteristic, the messages comprise a second field containing a reference address of the server, and the processing means store information on the utilization of the messages, said information being sent to said server.

According to another characteristic, the processing means are constituted by a service module, which is automatically configured during its activation based on selection conditions contained in the third field.

According to another characteristic, the service module is written in a high-level language interpreted by the virtual machine of a SIM card.

According to another characteristic, the service module includes means for sending an acknowledgement of receipt of the message stored based on selection data contained in a third field.

According to another characteristic, the service module includes means for sending an acknowledgement of receipt accompanied by the profile of the user of the wireless telephone, based on selection data contained in the third field of the message.

According to another characteristic, the service module comprises means for activating the display of each message based on selection data contained in the third field of the message.

According to another characteristic, the selection data includes a first counter of the number of displays.

According to another characteristic, the selection data includes a second counter of display initializations.

According to another characteristic, the selection data includes an indicator of the display mode, chosen from several possible modes According to another characteristic, the display modes are parameterizable and multiple.

These modes correspond to at least:
a) the mode for displaying the message every N times the wireless telephone is turned on;
b) the mode for displaying the message every N times a call is made by the subscriber;
c) the mode for displaying the message every N times a call is made to a particular number;
d) the mode for displaying the message every day starting at a given time;
e) the mode for displaying the message every time a call ends;
f) the mode for displaying the message when chosen by the user while running through the menu.

According to another characteristic, the service module comprises an algorithm for transforming the message based on a user profile stored in the SIM card.

According to another characteristic, the service module comprises an algorithm for processing constants and replacing them with names and vice versa.

According to another characteristic, the service module includes means for sending notifications, the notifications containing the number of displays, the profile of each user, data identifying the message number and the advertising client.

Another object of the invention is to offer a method for transmitting messages.

This object is achieved through the fact that the method for transmitting messages in a telecommunication network comprising a communication server and at least one wireless telephone, said server comprising means for sending messages to one or more wireless telephones, the wireless telephone or telephones being equipped with means for displaying and means for storing and processing messages, is characterized in that it comprises:
   a step for sending a message comprising a field containing information relative to the type profile of the recipient of the message;
   a step for processing the message received by the recipient and for comparing the profile contained in this message with the user's subscriber profile stored in the memory of the wireless telephone; and
   a step for storing the message in the storage means of the wireless telephone if the user's subscriber profile is compatible with the type profile contained in the message.

According to another characteristic, the method includes a step for displaying messages upon occurrence of events specified in a field of the message.

According to another characteristic, the method includes a step for sending an acknowledgement of receipt of the message.

According to another characteristic, the method includes a step for sending an acknowledgement of receipt of the message, the acknowledgement of receipt being accompanied by the profile of the user that received the message.

According to another characteristic, the method includes a step for sending a notification from the wireless telephone to the server containing the number of times a given message has been displayed, the profile of the wireless telephone that displayed it, and data identifying the number of the message displayed and sent by an advertising client, as well as data identifying the advertising client.

A final object of the invention is to offer a system for investigating the utilization of services offered by wireless telephones, this investigation system allowing the use of the message for advertising or promotional purposes.

This object is achieved through the fact that the transmission system is used to investigate services offered by the server, which comprises an algorithm for logging and extracting statistics from notifications or acknowledgements of receipt received from the wireless telephone or telephones of the transmission system.

BRIEF DESCRIPTION OF THE DRAWINGS

Other characteristics and advantages of the present invention will emerge more clearly from the reading of the following description, given in reference to the attached drawings, in which.

DESCRIPTION OF THE PREFERRED EMBODIMENTS

Figure 1:
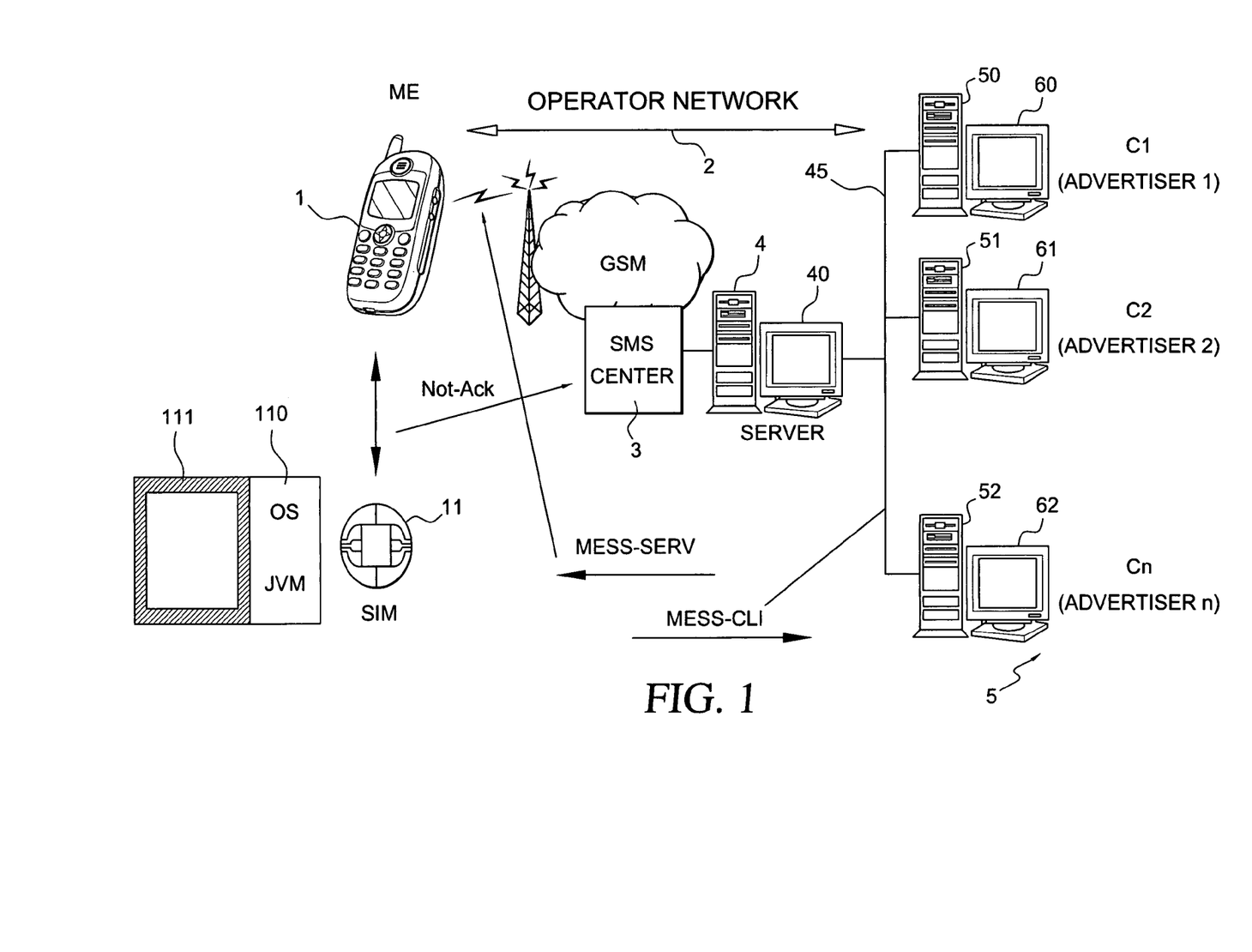
FIG. 1 represents a schematic view of the components of the message transmission system.

The system of the invention comprises, as represented in FIG. 1, a land-based system constituted by a server (4) that delivers the specific advertising service, this server (4) being connected by a link to the short message processing center SMS (3) which communicates through the GSM network with one or more wireless telephones (1). Each of the wireless telephones (1) is equipped with a SIM card (11). The general architecture of the integrated circuit contained in the SIM card is generally constituted by a microprocessor connected to a link bus that is linked to the memories (110) of the card. The memories can be of various types, and may or may not be programmable or volatile, and in general the SIM card includes a combination of these various types. The operating system and the virtual machine in a high-level language of the "Java" type are included in a nonvolatile memory, and specific service modules (111) developed in a high-level language such as "Java" can also be stored, either in the programmable nonvolatile memory or in the read-only memory. These specific service modules are programs which, when installed in a programmable nonvolatile memory, can be downloaded into the SIM cards (11) of GSM wireless telephones (1). The server (4) at the operator's location includes a server program (40, FIG. 2b) that makes it possible to communicate via links with the short message center SMS (3), and via the network (45) with a set (5) of client stations (50-51-52). Each client station (50, 51, 52) includes a client program specific to the services (60-61-62) that the respective clients (C0-C1-C2), advertisers and service providers, wish to broadcast through the wireless telephone network.

Figure 2A:
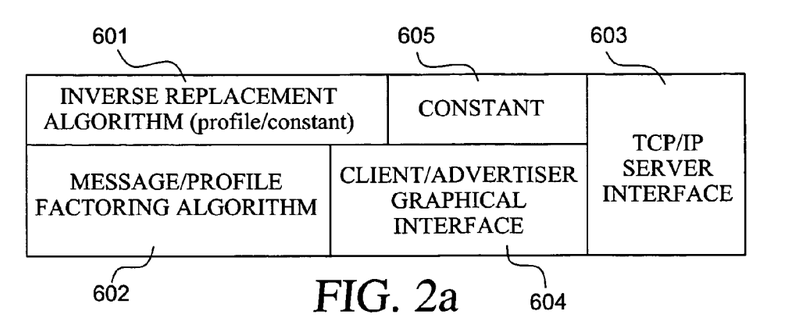
FIG. 2a represents the software components installed in each station of the advertising client.

As the execution of a program in a station generally results in a display urging a user to perform certain actions, the specific client programs are represented by the part (60, 61, 62) that is visible on the screen, but it should be understood that these programs are stored in the memory of each client station and executed by the respective processor, and that each client station includes the same software module, called a client module, represented for the client C0 in FIG. 2a.

The software installed in each client station is represented in FIG. 2a. This software includes an inverse algorithm (601) for replacing elements of the profile with constants, a second algorithm (602) for factoring the various messages with different profiles in order to generate generic messages, and an interface (603) that allows communication with the server (4) using a protocol such as, for example, the TCP/IP protocol. Finally, the program of the client station also includes a graphical interface (604) that makes it possible either to display messages or icons for communicating with the advertising client and to allow the entry of the desired messages and profiles, or to display histograms or graphics generated by the statistics gathered.

Figure 2B:
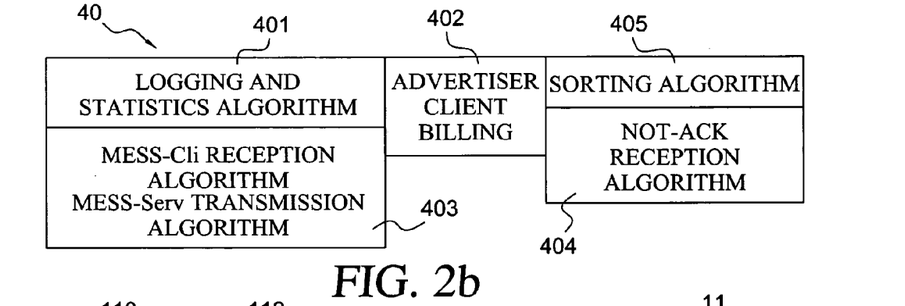
FIG. 2b represents the software components installed in each server of the network.
Figure 2C:
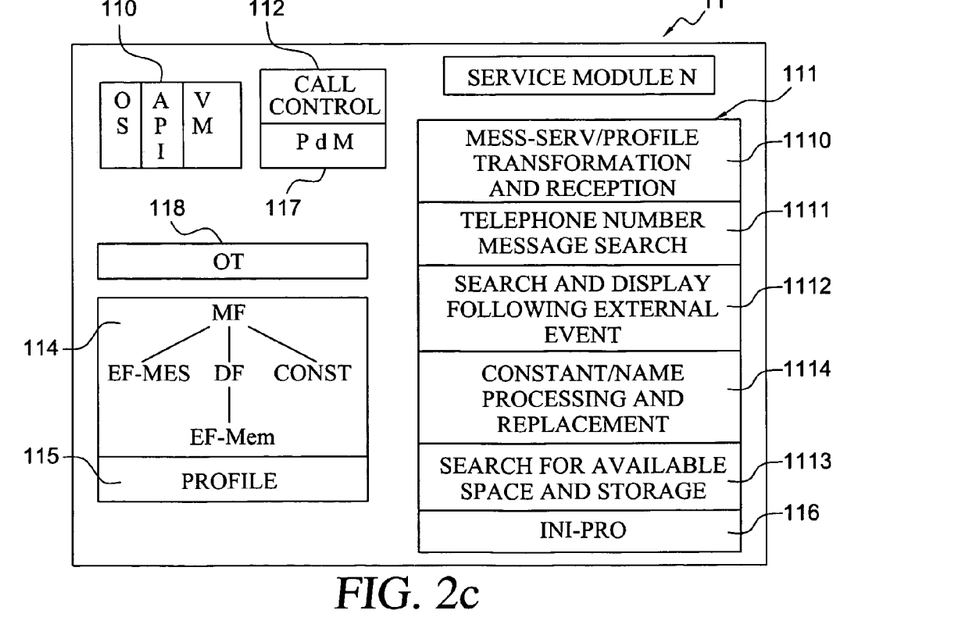
FIG. 2c represents software the components and the information stored in the SIN card with which each wireless telephone is equipped.

FIG. 2b represents the various modules constituting the program (40) of the network server (4). A first module (401) is constituted by the logging and statistics algorithm. A second module (402) handles the billing of the advertising client. A third module (403) handles the reception of the messages from the advertising client and their transmission to the SMS center (3) of the GSM network (2). Finally, a fourth module (404) handles the reception of notification or acknowledgement messages (Not-Ack) from the client using the wireless telephone (1) or from another SMS center of the GSM network. FIG. 2c represents the software layer required for the operation of the SIM card (11) of the user client. This software layer is constituted by an operating system OS, an application program interface API, and a virtual machine VM. The application program interface API allows communication between the operating system and the virtual machine VM. The virtual machine VM is constituted by a high-level language interpreter that makes it possible to interpret instructions from either the service module specific to the invention (111), or from other modules such as the service module N. This specific service module (111) comprises:

an algorithm (1110) for receiving and transforming messages based on the profile of the card;
    an algorithm (1111) for searching for messages having the telephone number entered on the keypad by the user;
    a third algorithm (1112) for searching for a display following an external event;
    a fourth algorithm (1113) for searching for available space;
    and finally, a fifth algorithm (1114) for processing constants and replacing them with names.

The integrated circuit constituting the SIM card (11) also includes a so-called call verification algorithm (112), and the data files transmitted by the operator network to the SIM card of the user client are stored in a file (V-DATA) of a memory (114) organized in directory form. The profiles (113, FIG. 4) include the display control information (V-AFF) that allows a subscribing user to consult them at certain times. These profiles (113) are also stored in a nonvolatile part of a programmable memory of the SIM card. The software (40) of the network server (4) is responsible for handling the sending of messages to subscribers, the monitoring of returned messages, the statistical calculation of the utilization of the messages to be displayed, and the downloading of these results to the various service-providing and advertising clients. The software (60, 61, 62) of the advertising client station makes it possible to design the messages to be displayed and the selection messages according to the invention, to send them to the server and to deliver to the service-providing client the statistical results received from the server (4).

To begin with, the graphical interface (604) allows the service provider to generate short messages which will subsequently be sent through the network (2), whose impact on the subscribers it wants to know. These selection messages (Mess-Cli) contain display control data (V-AFF). Once these messages (Mess-Cli) are generated, a client station (50 or 51 or 52) transmits them to the network server (4) which, using its send algorithm (403) sends transport messages (Mess-Serv) to a certain number of selected subscribers, using the point-to-point mode SMS-PP or broadcast mode SMS-CB. Third, the server (4) receives data on the utilization by the various subscribers of the messages sent through the network. The software of the server (4), via its logging algorithm (401), stores the data received, incorporates it into statistical tables, and sends it to the station of the respective client (C0, C1, C2). Finally, the advertising client or service provider consults the statistics in its client station in order to learn the impact of these messages and, if necessary, to modify the messages and re-send them through the network server (4).

The programs (111) incorporated into the SIM card constitute primitives and make it possible to receive the messages that reach the wireless telephone (1) through the network of the operator (2), process them so as to extract those that concern the subscriber, display them and send acknowledgements of receipt or notifications to the server of the network (4).

The SIM card belongs to the operator, which then transmits the message to a subscriber. The subscriber is listed by a unique number contained in his card, so the subscriber is completely authenticated by it. The wireless telephone is an object that can only be used by a subscriber on the condition that it contains a SIM card. The SIM card is widely specified by the standard known as ETSI-GSM 11.11. The SIM card has an operating system capable of processing the information received by the wireless telephone and contained in a programmable nonvolatile memory. This memory contains data files configured for the GSM application. The operating system includes one part written into the ROM and another part written into the programmable memory. The primitives are stored in dedicated fashion in the programmable memory, thus making it possible to add new functions or to modify the existing primitives, but it is also possible to write them into the ROM. Advantageously, the primitives are written in high-level language, and interpreted during their execution by a virtual machine. In the remainder of the document, the operating system is considered to be the executable program stored in the ROM and/or downloaded into the programmable memory, and the primitives are considered to constitute the program that implements the invention in the card.

As seen above, the messages are stored in a file upon reception. According to the present invention, the messages received by the SIM card are interpreted by the primitives of the algorithm (1110), which fulfills the function of a filter on the data of the transport message (Mess-Serv). Only the transport messages (Mess-Serv) that satisfy certain criteria make it possible to store the message to be displayed: these criteria are linked to the subscriber's profile (115). This profile includes the name, date of birth (thus determining the subscriber's age), sex, subscription type (which may provide an indication of the revenue from the subscriber and the geographical area of the subscriber's movements). This information is stored in a file of the SIM card called "PROFILE." The writing of data into this file is subject to some conditions, for example, the correct presentation of the user identification code. It may be read openly. When this data is absent or unusable, or when the file PROFILE does not exist, the primitives of the SIM card do not perform any filtering.

Figure 3A:
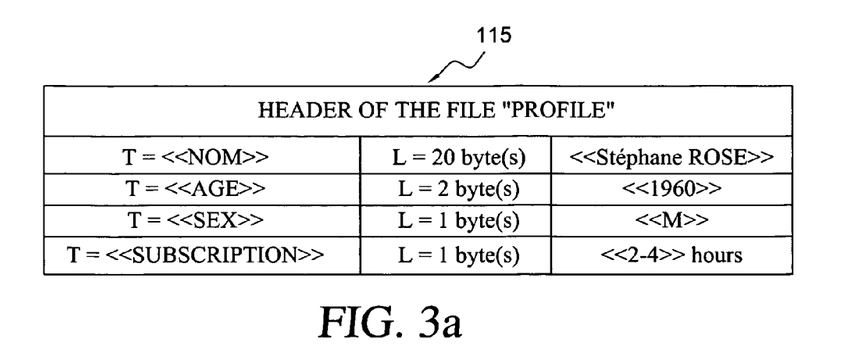
FIG. 3a represents the profile file stored in the memory of the SIM card with which each wireless telephone is equipped.

The data in the file PROFILE (115) are written in a structure that is standard in microprocessor cards, which corresponds to the structure T, L, V. The structure of the file PROFILE is represented in FIG. 3a. T is the identifier of the data, L is the length in bytes, and V is the data. The data is written in the form of BCD codes for numerical values and ASCII for alphabetic codes.

In the example of FIG. 3a, the subscriber whose name is "Stéphane Rose" was born in 1960, is male and has a type 2 subscription, whose rate includes 4 hours of communication per month. The file PROFILE is created in the customization phase of the SIM card. When the subscriber receives his SIM card at the same time as his subscription, by means of a primitive ("INI-PRO") (116, FIG. 2C) for updating the file PROFILE, the subscriber or a user authorized by the subscriber writes the information related to him into this file. The writing of this information is conditioned by the correct presentation of the user identification code. Other primitives are capable of processing the information contained in the file PROFILE (115).

An advertising client and service provider generates a message to be displayed (V-DATA), which is itself incorporated into a selection message (Mess-Cli) in a client station. It enters, into specific fields that appear on a screen (60, 61, 62), the data that will be displayed on the wireless telephone, as well as the type profile of the subscriber who may be interested in the message to be displayed. The message is said to be "multi-profile" since it can be suitable for subscribers whose profile data is different. The age is entered in the client station in the form of an interval between two years of birth, for example 1950 to 1980. If there are several possible subscription types, the numbers corresponding to each of the types are listed, separated by commas. If a subscription time is specified, the number of hours is indicated, for example 4 hours.

This operation, called "typing," makes it possible to create in the memory of the client server (60, 61, 62) a table summarizing the information entered by the service provider. Having incorporated the three criteria mentioned above—age, sex and subscription—the table in the client station (50, 51, 52) is, for example, entered into the field V-TYP of FIG. 3c.

Figure 3B:
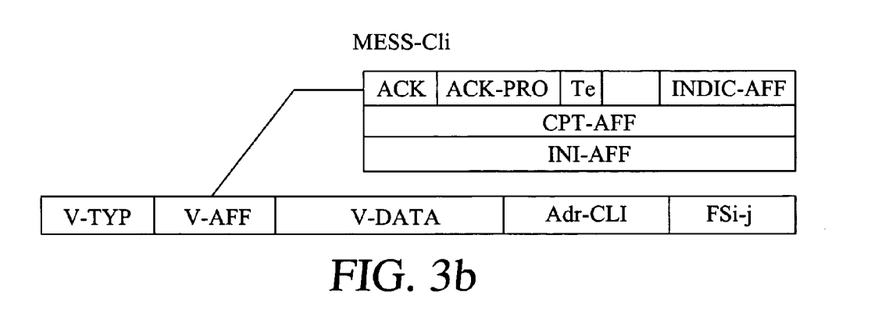
FIG. 3b represents the structure of the selection message sent by each client station to the server, to which they are linked via a hard-wired network.

The service provider also enters into the selection message the display mode (V-AFF) of the message to be displayed. The client module formats the data in the specific fields according to their characteristics. Each element of the short message is codified and is presented in a structure with three fields T, L V, in which the field T contains the identifier of the data, L contains the number of bytes in the data, and V contains the data. The typical structure of a selection message (Mess-Cli) sent by a client is represented in FIG. 3b.

In this figure, the field V-TYP contains the multi-profile information, the field V-AFF contains the information on the display mode for the subscriber, and the field V-DATA contains the data to be transmitted to the subscriber. These are the ASCII codes containing the messages. The field Adr-CLI is the address of the client. The field FSi-j is the message number: it is based on a service provider reference owned by a client (FSi) and a number "j" of a message posted by this client module.

The information linked to the display mode is contained in the field V-AFF, which is divided into three parts, for example of one byte each. The first part comprises three indicators: a first "ACK" (bit 7), a second "ACK-PRO" (bit 6) and a third "INDIC-AFF" (bit 2,1,0). A fifth bit Te requests the receipt of an erasure notification. The fourth bit is reserved. The second part contains: a first numerical value constituting a counter "CPT-AFF" and the third part contains a second numerical value constituting a second counter "INI-AFF." Each of the parts being represented by one byte, V-AFF is therefore composed of three bytes.

If the bit of the first indicator ACK (bit 7) is at "1," an acknowledgment of receipt is sent when the message (Mess-Serv) is received in the subscriber's card. The acknowledgement of receipt is sent to the server (4) via the wireless telephone (1) and the network, in the structure represented in FIG. 5, which will be described below. If the bit ACK is at "0," all of the messages sent are considered to have actually been received by their recipients; this is generally the case.

If the bit of the second indicator ACK-PRO (bit 6) is at "1", the subscriber's profile stored in the file PROFILE of the card (11) is sent to the network server (4) at the time of the acknowledgement of receipt and at the time of each notification issued, for example, during the reading of the message by the subscriber. Thus, the server (4) can know the exact profile of the interested subscribers, and even the uninterested subscribers (for this reason, the bit of the first indicator ACK must also be set at "1").

The third indicator INDIC-AFF contains the conditions for activating the display on the mobile telephone, which are read by the service module (111) during its activation and used to automatically configure the service module. This makes it possible to make the service module (111) entirely generic, including the search and display algorithm (1112).

If the value of the indicator INDIC-AFF is equal to "0010," then the message is displayed during each of the subscriber's calls. The value of the second counter INI-AFF represents the number of times that the message should be displayed. During the storing of the message to be displayed (V-DATA) in the storage file EF-Mem of the memory (114), the primitive updates the content of the first counter CPT-AFF to "00." With each telephone call, the message stored in V-DATA is output by the card and is displayed on the display device of the wireless telephone. Then, the value contained in the first counter CPT-AFF is incremented. When the value of the first counter CPT-AFF becomes equal to the value contained in the second counter INI-AFF the message is no longer sent by the card. The message is no longer displayed automatically, and will be erased when a more recent message takes its place through the execution of the algorithm (1113) for searching for available space.

If the value of the indicator INDIC-AFF is equal to "0011," then the message is displayed with every N times the subscriber makes a call. The value of the second counter INI-AFF, in this case, represents the number of intervening calls between two displays of messages on the wireless telephone. The value of the first counter of CPT-AFF represents the number of times that the message is displayed. During the storing of the message in the storage file EF-Mem, the primitive (1113) updates to "00" the content of a working byte OT in the RAM (118) of the card. Then, the value contained in this working byte OT is incremented with each call. When its value becomes equal to the value contained in the second counter INI-AFF, and as long as the value of the first counter CPT-AFF is not equal to "00," then the message to be displayed contained in V-DATA is sent by the card and displayed on the wireless telephone (1). The value of the counter CPT-AFF is decremented, and the value of INI-AFF is written into the working byte. When the value of the first counter CPT-AFF becomes equal to "00," then the message is no longer displayed automatically; it will be erased when a more recent message takes it place.

If the value of the indicator INDIC-AFF is equal to "0100," then the message is displayed each time the wireless telephone (1) is turned on, which corresponds to each time the subscriber connects to the network. The value of the second counter INI-AFF in this case corresponds to the number of times that the message is displayed. During the storing of the message in the storage file EF-Mem, the primitive (1116) updates to "00" the content of the first counter CPT-AFF. With each call to be displayed, the data of the message contained in the field V-DATA of the storage file EF-Mem is output from the card and displayed by the wireless telephone. Then, the value contained in the first counter CPT-AFF is incremented. When the value of the first counter CPT-AFF becomes equal to the value contained in the second counter INI-AFF, the message to be displayed (V-DATA) is no longer sent by the card. The message is no longer displayed automatically; it will be erased when a more recent message takes its place.

If the value of the indicator INDIC-AFF is equal to "0101," then the message is displayed every N times the wireless telephone is turned on. The value of the second counter INI-AFF represents the number of times it is turned on between two displays of the message on the wireless telephone, and the value of the first counter CPT-AFF represents the number of times that the message is displayed. During the storing of the message in the storage file EF-Mem, the primitive updates to "00" the content of a working byte (OT) in the RAM (118) of the card. After that, the value contained in this working byte (OT) is incremented with each call by the user. When its value becomes equal to the value contained in the second counter INI-AFF, and as long as the value of the first counter CPT-AFF is not equal to "00," then the message is sent by the card and displayed on the wireless telephone: the value of the first counter CPT-AFF is decremented and the value of the second counter INI-AFF is written into the working byte. When the value of the first counter CPT-AFF becomes equal to "00," then the message is no longer displayed automatically; it will be erased when a more recent message received from the server (4) takes its place.

The protocol between the card and the wireless telephone that makes it possible to display messages is called the "SIM Toolkit protocol." It is specified in the ETSI-11.14 standard.

The server (4) receives the selection message (Mess-Cli) coming from the client (C0, . . . C2). It adds to the selection message a last field containing its address (Adr-Serv) so that the wireless telephone returns to it an acknowledgement of receipt of the transport message (Mess-Serv) and the utilization data of the message to be displayed (V-DATA). If the transport message is the SMS-PP type transmitted point-to-point, the addresses of the sender (Adr-CLI) and the recipient (a SIM card) are indicated in the transport layer.

Figure 3C:
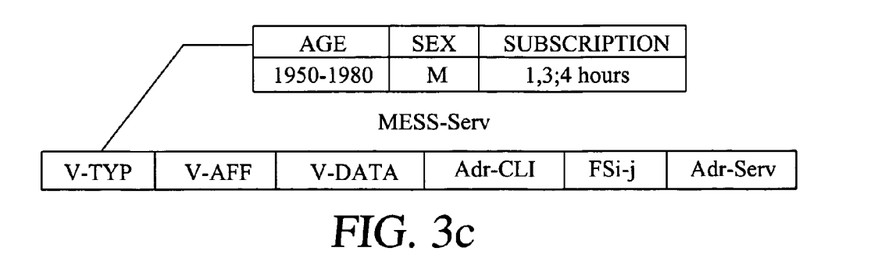
FIG. 3c represents the structure of each transport message sent by the server upon reception of a selection message from a client.

Through the GSM network, the wireless telephone receives the message (Mess-Serv) whose structure, represented in FIG. 3c, corresponds to that of the selection message (Mess-Cli) with an added field containing the address (Adr-Serv) of the server (4).

The wireless telephone (1) recognizes from the transport layer of its operating system that this is an SMS message and transmits it to the SIM card (11). The latter decodes the various fields based on their identifiers T and activates the primitive (1110) for receiving a new message. If the bit ACK is at "1," an acknowledgement of receipt is sent to the server (4) whose address is specified in the server address field (Adr-Serv), or in the transport layer if it is a short message of the SMS-PP type.

After decoding, the message to be displayed (V-DATA) is normally stored in a storage file called "EF-Mem." To begin with, the primitive, using the algorithm (113), checks to make sure that the message has not already been recorded; this check is performed by comparing the message numbers FSi-j and server address field values (Adr-Serv) of the messages already stored in a specific file EF-MES with those of the message received. If the message is actually new, then the primitive tests to see if the subscriber profile contained in the memory (PROFILE) is compatible with the typing data (V-TYP) contained in the message (Mess-Serv).

The first field of the typing data "AGE" is then checked. In the above example, the subscriber was born in 1960 and the message received is intended for subscribers born between 1950 and 1980, so this message may be intended for him. Next, the operating system checks the second field "SEX"; the subscriber is also male, so this message may be intended for him. Finally, the field "SUBCRIPTION" is tested. The subscriber has, for example, a type 2 subscription, whereas the message is intended for those having type 1, 3 and 4 subscriptions. Therefore, this message is not intended for him; it is not stored in the SIM card and the subscriber will not know about it. Assuming that the profile of the subscriber stored in the memory PROFILE (115) is compatible with the type V-TYP of the message received, then the message to be displayed is stored in the storage file EF-Mem and the SIM card sends an indication to the wireless telephone.

A first improvement consists of establishing a grammar for interpreting the transport messages (Mess-Serv) coming from the server. This grammar can have the same syntax as the language PASCAL, i.e., adopting instructions such as IF, THEN, ELSE or CASE (1): . . . (2): . . . (3): . . . . With a grammar of this type, it is possible to associate different data blocks in the same message so that, depending on the case, one message is displayed rather than another. For example, it is possible to specify that: IF the subscriber was born between 1950 and 1959 THEN a first message is displayed, ELSE another message is displayed. Another example consists of conditioning the message based on the subscription type: IF the subscription is "1," then display "message 1"; IF the subscription is "2," then display "message 2"; IF the subscription is "3," then display "message 3"; etc.

A second improvement consists of using, in the card and in the client station, a constant file (CONSTANT), which makes it possible to reduce the size of the messages. The constant file (CONSTANT) is a table with as many lines as there are constants. The constants are referenced by a code associated with a character string or with an address. As stated above, the field (V-DATA) of a transport message (MES-SERV) contains data to be displayed on the wireless telephone (1), and said data are coded in ASCII. For example, the year 1999 is coded in the form of four ASCII codes: 31H, 39h, 39h, 39h. Since this character string is used often, it is useful to replace it with a code, 89*h* for example. In the constant file (CONST), a line comprises the following data: the code "89," followed by a byte containing the size of the character string, and finally, the character string 31H, 39h, 39h, 39h. The primitive (1112) for displaying the data of the message reads the data to be displayed; as long as the value of the bytes corresponds to a displayable ASCII code (displayable codes have values between 20h and 7Fh), the primitive (1112) of the card transmits them as is to the wireless telephone (1). If the value of the byte read does not correspond to a displayable ASCII code, then the primitive (1114) will search in the constant file (CONST) for the character string that corresponds to this value. If the value in the constant file (CONST) has a value corresponding to the size of the character string equal to "00," then the two bytes that follow correspond to an address in four bytes. In this case, the primitive (1114) will take as a character string whatever is stored at the address specified in these four bytes. The four bytes represent the reference of the file in which the string is located (in two bytes) and the address within this file (in two bytes).

After a display of the message, if the subscriber is interested, he calls the service provider whose address or telephone number is found in the data field (V-DATA) of the received message to be displayed. The call can be simplified by the display of the address or the number on the wireless telephone, and by a particular key that makes it possible, when the subscriber presses it, to compose said address or said number on the wireless telephone.

Figure 4:
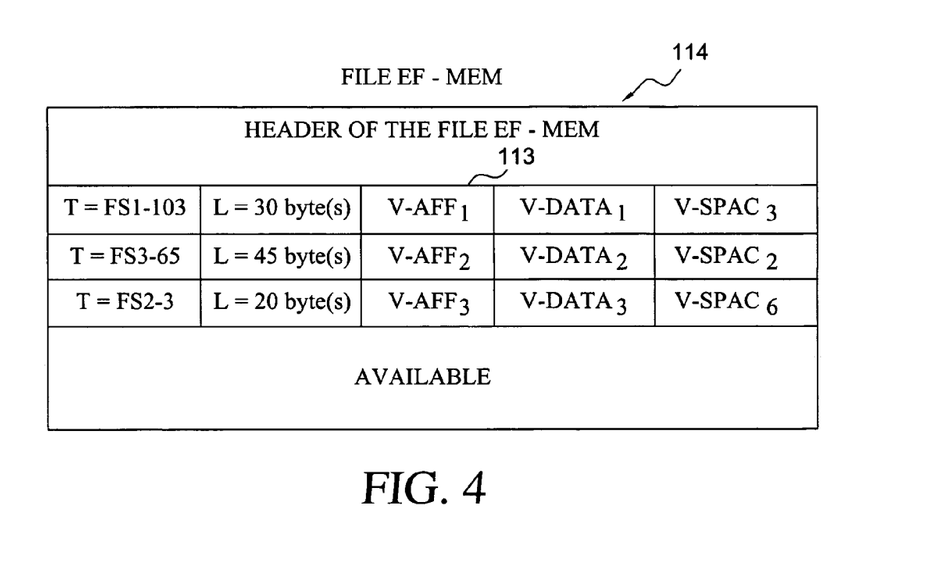
FIG. 4 represents the structure of the file stored in the nonvolatile memory of the SIM card with which each wireless telephone is equipped.

The storage file EF-Mem, represented in FIG. 4, is organized in the form of a table having as many lines as there are short messages to be stored. When the user wants to consult the messages stored in his SIM card, he interrogates his wireless telephone, and the latter sends commands for reading the SIM card. During each reading by the wireless telephone of the SMS message referenced i, a call notification is sent to the server (4).

The size of the storage file EF-Mem is a direct function of the quantity of messages it can contain. Given a memory of 8 or 16 Kb, which is standard for a SIM card, the storage file EF-Mem should have a size on the order of one Kb.

In the above example, the storage file EF-Mem contains three messages. The first was sent by the service provider identified "FS1" and the number of it message is "103"; the content of the message to be displayed contains 30 bytes. The notification to be sent when this message is used is sent to server number 3, whose address is equal to V-SPAC$_3$. The second message was sent by the service provider "FS3"; its number is "65"; the notification to be sent when this message is used is sent to server number 2, whose address is equal to V-SPAC$_2$. An improvement consists of creating a fifth column in the body of the storage file EF-Mem; information related to the way in which the message is used is stored in it.

When the file is full, a new message is stored by the primitive (1113) by erasing one or more messages. In an intrinsically known way, this primitive first erases the oldest messages in order to free up enough space for the new message. This management requires a pointer (PdM) indicating the last message entered (the most recent). Since the reading of the stored lines is done in circular fashion, the message located immediately before the one pointed to is the oldest.

As stated above, a notification to the server (4) specified in the storage file EF-Mem is sent at the time of each utilization. This notification contains the same information as the acknowledgement of receipt that may be sent when the message is written into the file. The structure of a notification or an acknowledgment of receipt appears in the form represented in FIG. 5.

Figure 5:
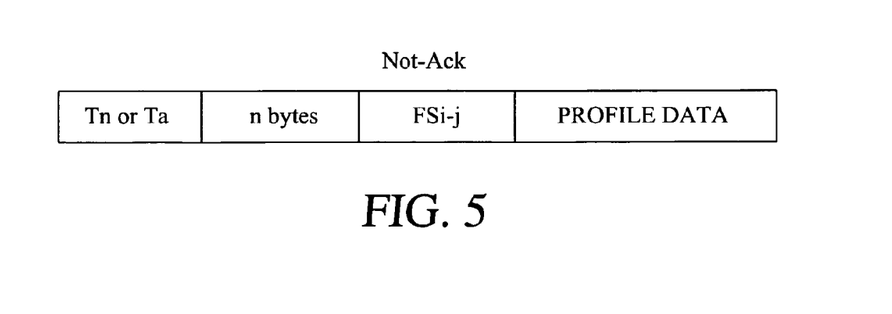
FIG. 5 represents the structure of the notification messages or acknowledgements of receipt returned by each wireless telephone to the server that sent a given message.

A notification or an acknowledgement comprises the following information:
- an identifier (Tn for a notification or Ta for an acknowledgement of receipt)
- a byte length value of the data field that follows
- a message number FSi-j
- possibly the subscriber's profile data as read in the file PROFILE (if the bit ACK-PRO and the bit ACK stored in V-AFF are at "1").

An improvement of the invention consists of sending a notification to the server (4) during the erasure of the message in the storage file EF-Mem of the SIM Card, triggered by the primitive (113). This transmission can be controlled by a bit of V-AFF, the fifth bit, for example referenced "Te." The identifier Te of such a notification is specific. The server (4) is warned that the message to be displayed (V-DATA) is no longer in the SIM card. It can then re-send it if it thinks this message is important. The service provider can request that this message be displayed regularly during a certain period, for example one month; if this message is erased, as long as the period has not elapsed, the server resends it. It is also possible to authorize the subscriber to erase the message in the storage file EF-Mem; if this erasure occurs after the first display, it may be assumed that the subscriber is not interested in it. This information is useful for the statistical operation performed by the server (4).

The server (4) receives the various notifications and/or acknowledgements of receipt and calculates statistical data on the utilization of the messages. For this reason, it has a memory of large size, constituted by a computer hard disk, in which the messages coming from the various clients (C1, . . . , Cn) are stored, as well as the notifications and acknowledgements of receipt coming from the various subscribers.

Each message coming from a client (C1, . . . , Cn) is referenced by its message number FSi-j. This number also being present in the notification and acknowledgement of receipt messages, the server can therefore, using the primitive (405) for sorting notifications from acknowledgments, sort the notifications or acknowledgments in its memory based on the advertising client numbers. It counts, in a specific field associated with he message, the number of acknowledgements of receipt and the number of notifications. The server (4) also analyzes the profile sent in the notification or the acknowledgement and can thus establish the type profiles of the subscribers.

Let the message whose type profile determined by the advertising client be the following:

| | | |
|---|---|---|
| 1950–1980 | M | 1, 3; 4 hours |

After it is broadcast by the network, and upon reception of a notification or acknowledgement of receipt, the server can establish, for example, the statistical report below.

1—Number of subscribers having sent only the acknowledgement of receipt (no display, the message was not stored): 1405

| | |
|---|---|
| Age | 17% are from 10 to 19 years old |
| | 33% are from 20 to 29 years old |
| | 28% are from 30 to 39 years old, etc. |
| Sex | 39% are male |
| | 61% are female |
| Subscription | 14% have a subscription "1" |
| | 49% have a subscription "2", etc. |

2—Subscribers having sent at least one display notification: 508

| Number of displays | 1 | 2 | 3 | 4 | 5 | 6 | 7 | 8 |
|---|---|---|---|---|---|---|---|---|
| Number of subscribers | 192 | 156 | 84 | 56 | 12 | 5 | 1 | 0 |

Although particularly adapted to advertising applications, the present invention can be used in other fields. For example, it can be used by a travel provider. The trips are defined by a departure point, a destination, a date and a price; the card compares the user's profile with the elements of the trip that are transmitted to it and selects trips, giving them order of priority. The travel provider can thus adapt its offer based on the wishes (and hence the profiles) of the subscribers. The present invention has been described in its utilization with a GSM type system, but it can be used in any other communication system, whether or not it is wireless.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. Method for transmitting messages in a telecommunications network comprising a communications server and at least one wireless telephone, said server comprising means for sending messages to one or more wireless telephones, the wireless telephone or telephones being equipped with memory means for storing and processing messages, wherein it comprises:
 a step for sending a message (Mess-Serv) comprising a field (V-TYP) containing at least one information in a plurality of sub-fields relative to the standard profile of the recipient of the message, and
 a step for processing the message received by the recipient, for identifying and for comparing each information of the sub-fields in the standard profile contained in this message (Mess-Serv) with each information of a user's subscriber profile stored in the memory means of the wireless telephone,
 a step for storing the message in the storage means of the wireless telephone if the user's subscriber profile is compatible with the standard profile contained in the message, and
 a step for sending a notification from the wireless telephone to the server, containing a number of times a given message has displayed a profile of the wireless telephone that displayed it and data identifying the number of the message displayed and sent by an advertising client, as well as data identifying the advertising client.

2. Method according to claim 1, wherein the wireless telephone or telephones comprise display means, the method including a step for displaying messages upon occurrence of events specified in a field of the message.

3. Method according to claim 1, wherein it includes a step for sending an acknowledgement of receipt of the message.

4. Method according to claim 1, wherein it includes a step for sending an acknowledgement of receipt of the message, the acknowledgement of receipt being accompanied by the profile of the user that received the message.

5. A method according to claim 1 further including the step of logging and extracting statistics from notifications or acknowledgements of reception received from the wireless telephone using an algorithm in the server.

6. A method for operating a wireless telephone receiving messages from a communications server a, said server sending messages to one or more wireless telephones, the wireless telephone or telephones being equipped with memory means for storing and processing messages wherein said method comprises:
 a step for receiving a message (Mess Serv) comprising a field (V-Typ) containing at least one information in a plurality of sub-fields relative to a standard profile of the recipient of the message,
 a step for processing the receiving message thereby identifying and comparing each information of the sub-fields in the standard profile contained in contained in the message (Mess-Serv) with each information of a user's subscriber profile stored in the memory means of said wireless telephone,
 a step for storing the message in the storage means of the wireless telephone if the user's subscriber profile is compatible with the standard profile contained in the message, and
 a step for sending a notification from the wireless telephone to the server, containing a number of times a given message has been displayed and data identifying the number of the message displayed, a profile of the wireless telephone that displayed it, and data identifying the number of the message displayed and sent by an advertising client, as well as data identifying the advertising client.

* * * * *